United States Patent [19]

Tomlinson

[11] Patent Number: 4,967,859
[45] Date of Patent: Nov. 6, 1990

[54] VEHICLE WITH FRONT AND REAR WHEEL STEERING AND A STEERING SYSTEM WHICH INCLUDES SKID SIMULATION AND CONTROL

[75] Inventor: John P. Tomlinson, Sevenoaks, England

[73] Assignee: Astatic Cars Limited, Kent, England

[21] Appl. No.: 270,658

[22] Filed: Nov. 14, 1988

[30] Foreign Application Priority Data

Nov. 13, 1987 [GB] United Kingdom ............... 8726657

[51] Int. Cl.⁵ .................................................. B62D 5/04
[52] U.S. Cl. ................................... 180/79.1; 180/140;
280/91; 303/61; 364/424.05
[58] Field of Search .................. 180/79.1, 140, 141,
180/142, 143; 280/91; 303/61, 100; 364/424.05

[56] References Cited

U.S. PATENT DOCUMENTS

| | | | |
|---|---|---|---|
| 2,587,377 | 2/1952 | Penrose | 180/79.1 X |
| 3,650,575 | 3/1972 | Okamoto | 303/61 X |
| 3,659,906 | 5/1972 | Horvath | 180/79.1 X |
| 3,698,772 | 10/1972 | Nixon | 303/61 X |
| 4,720,790 | 1/1988 | Miki et al. | 180/140 |
| 4,790,607 | 12/1988 | Atkins | 303/61 X |
| 4,809,173 | 2/1989 | Fukami et al. | 364/424.05 |
| 4,828,061 | 5/1989 | Kimbrough et al. | 180/142 X |
| 4,836,319 | 6/1989 | Haseda et al. | 180/79.1 |
| 4,856,607 | 8/1989 | Sueshige et al. | 180/79.1 |
| 4,865,146 | 9/1989 | Ohe | 180/79.1 |

FOREIGN PATENT DOCUMENTS

| | | | |
|---|---|---|---|
| 200065 | 9/1986 | Japan | 180/140 |
| 71760 | 4/1987 | Japan | 180/140 |

Primary Examiner—Mitchell J. Hill
Attorney, Agent, or Firm—Nies, Kurz, Bergert & Tamburro

[57] ABSTRACT

A vehicle used for training drivers in driving techniques such as skid control has front and rear axles each with steerable wheels. The two signals used to drive motors which control the steering angles of the front and rear wheels respectively are independently generated, may be changed while the vehicle is in motion to simulate a particular event such as a skid and respond to the drivers attempts to control the vehicle.

6 Claims, 2 Drawing Sheets

VEHICLE WITH FRONT AND REAR WHEEL STEERING AND A STEERING SYSTEM WHICH INCLUDES SKID SIMULATION AND CONTROL

BACKGROUND OF THE INVENTION

This invention is concerned with a road vehicle steering system.

Driver instruction and training generally makes no attempt to deal with the problems of controlling skids quite simply because safety considerations dictate that a lot of space be available when practising skid control and the necessary space is not readily available. Also to practice skid control a slippery surface is generally necessary. These two considerations combined have limited instruction and training in skid control to a very few specially prepared locations so that the average driver has no opportunity to develop any real skill in skid control.

SUMMARY OF THE INVENTION

It is an object of the present invention to provide a vehicle steering system that enables a driver to practice skid control on a dry road at low speeds.

The present invention includes a vehicle axle having road wheels, a steering mechanism having an input shaft for adjusting the steering angle of the road wheels, a motor connected with the input shaft, and means for generating a demand signal for the motor and a feedback signal indicative of movement of the input shaft, the motor the difference responding to the difference in signals between the demand and feedback signals to reduce the difference.

An embodiment of the present invention will now be described, by way of example, with reference to the accompanying drawing, in which:

DESCRIPTION OF THE PREFERRED EMBODIMENTS

Figure 1:
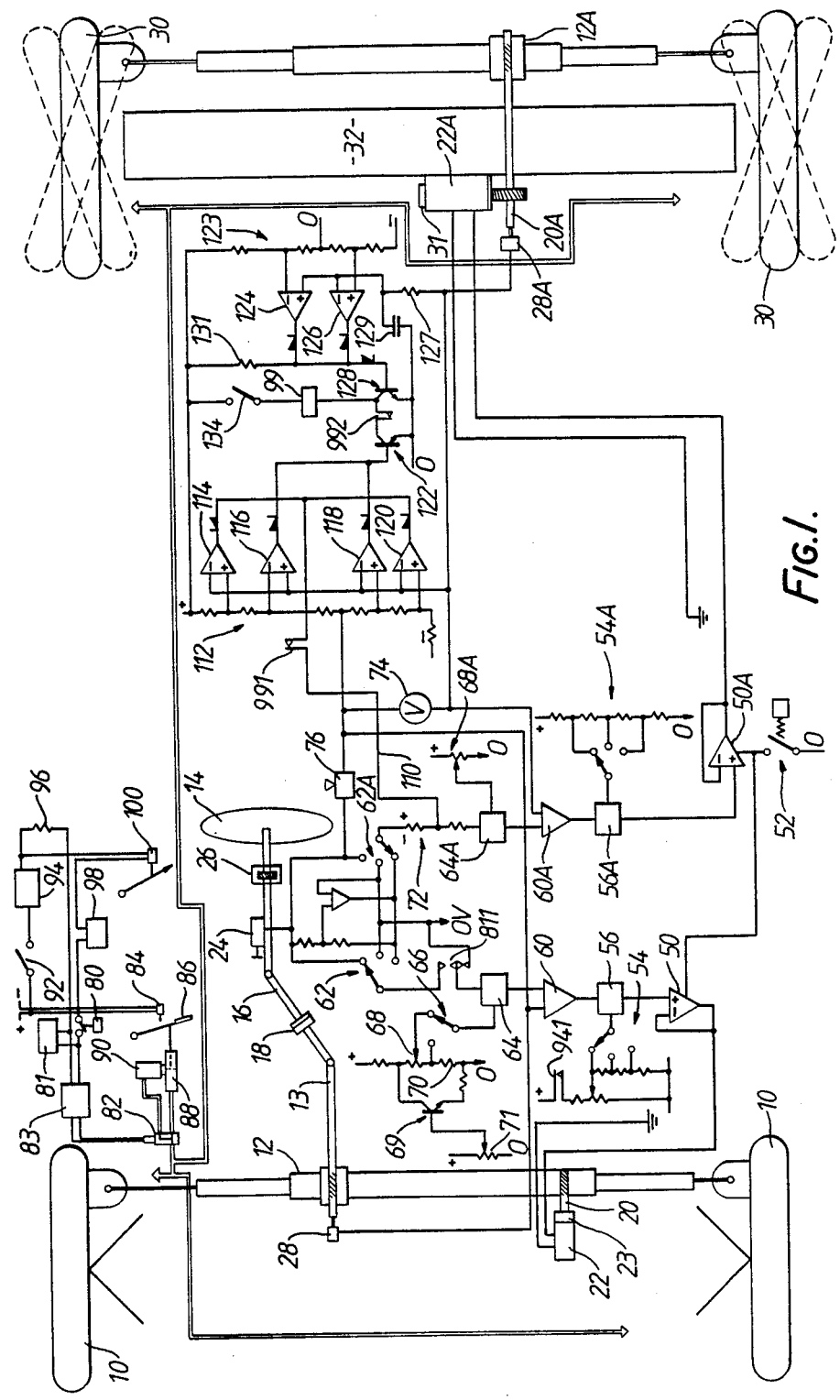
FIG. 1 is a combined electrical/mechanical schematic diagram of a vehicle steering system according to the present invention.

Referring now to the drawing, front wheels 10 of a road vehicle are connected for steering to a rack and pinion steering mechanism 12, the pinion shaft 13 being connected to a steering wheel 14 through a steering shaft 16 which incorporates a solenoid operated clutch 18. A second pinion shaft, 20 is also engaged with the rack and is driven through a clutch 23 by the output of a 10 volt shunt wound electric motor 22 to give a 22 to 1 reduction between the motor shaft and the pinion shaft 20. The clutch 23 is also solenoid operated. From the components so far described it can be seen that steering of the front wheels 10 can be effected either by the steering wheel 14 through the clutch 18 or by the motor 22 through the clutch 23, depending upon the energisation of the clutches 18 and 23.

Also associated with the steering shaft 16 a master potentiometer 24 and a positive stop device 26 which limits the steering wheel to two turns in either direction and incorporates a torque adjuster to give "feel" to the operation of the steering wheel. These components allow the motor 22 to give power assistance, when the steering wheel is in use, the potentiometer 24 providing a control signal to the electrical control circuit as will be described. A potentiometer 28 associated with the pinion shaft 13 and therefore responsive to movement of the rack in the mechanism 12 provides a feedback signal for control of the motor 22. In this embodiment the front wheels are the driven wheels.

The rear wheels 30 are also steerable by means of a rack and pinion mechanism 12A, the pinion shaft 20A again being driven by a shunt wound motor 22A. A brake mechanism 31 is provided for the motor 22A so that when the vehicle is used as a conventional road vehicle, i.e. not for purposes of instruction, the rear wheels can be locked in this central position.

Turning now to the electrical control circuit, the front and rear steering motors 22 and 22A are fed with electrical power from power amplifiers 50 and 50A respectively, the armature voltage providing negative feedback in each case s that the motor speeds may be controllable. In modified embodiments, the accuracy of such speed control may be improved by substituting the feedback armature voltage by the output of a tachometer generator, or by using as positive feedback a voltage proportional to the motor armature current.

The amplifiers 50 and 50A are provided with electronic switching, whereby a switch 52 acts as a system on-off switch without the necessity for physically switching the high current inputs to, or outputs from, the power amplifiers. This enables the switch 52 to be mounted in a hand-held control unit a will be described.

Switch 54 with an associated resistive network selects the maximum voltage which may be applied to the steering motor, and hence the maximum speed at which the motor may run, by the interposition of a level selector stage 56. The level selector stage 56 is designed to function equally in response to signals of either polarity from an amplifier 60, that is to say independently of the direction in which the motor rotates. A level selector 56A, controlled by switch 54A, operates similarly in respect of limiting the speed of the rear steering motor 54A.

The amplifier 60 generates a signal, subsequently fed as described through the level selector 56 to initiate rotation of the front steering motor 22, the output of the amplifier 60 being proportional to the difference between a voltage obtained from the feedback potentiometer 28 and a demand signal obtained from a second level selector stage 64. Since the motor acts to reduce this difference to zero (subject to amplifier sensitivity and system errors), the effect is to move the front wheels and so steer the car so that the front wheels point in a direction determined by the demand signal.

The demand signal comes essentially from a switch 62 which may take one of three positions, the central position giving a demand signal of zero, causing the front wheels of the vehicle to return to their central position and to remain pointing straight ahead regardless of the position or movement of the steering wheel, and regardless of external forces which the operation of the motor 22 will resist.

The other two positions of switch 62 cause the demand signal to be derived from the master potentiometer 24 with normal and inverted polarity (because of the inverting amplifier 66) respectively, the level selector 64 functions in a similar manner to level selector 56, the limiting level in this case being set by a combination of a switch 66 and a potentiometer 68. In the clockwise position of switch 66, the output voltage of the master potentiometer 4 is effectively limited to a positive or negative value determined by the setting of the potentiometer 68; this value is made to come within the mechanical limitations of the steering so that the motor 22 will not need to be operated against a mechanical stop—which might overload both the motor 22 and its associated power amplifier 50. In the anti-clockwise position of switch 66, the effective voltage is more severely limited by the ratio of potentiometer 68 to resistor 70. In both positions the effective signal can be further reduced by conduction of a shunt transistor 69 whose conductivity is controlled by potentiometer 71 coupled with the accelerator and supplied through a switch 73. This simulates a loss of vehicle control caused by excessive acceleration.

A brake override system is fitted to the vehicle and consists of a solenoid operated three port brake valve 82 and a plunger switch 84 operated by the brake pedal 86. The brake master cylinder 88 and brake fluid reservoir 90 are also shown. The brake override system is controlled by a switch 80 on the on the control panel. When the switch 80 is closed and the brake pedal is depressed to close the switch 84 the solenoid valve 82 is energised after a brief delay caused by a delay circuit 83 thus causing the valve 82 to release the brake fluid pressure between the master cylinder and the actual brakes and prevent additional braking. Closure of the switch 84 also energises a relay 81 whose contacts 811 change to disconnect the input to the level selector from the switch 62 and substitute a zero voltage system. This zero voltage demand signal causes the front wheels to return to their central position where they stay until the brake pedal is released to open the switch 84 and deenergise the relay 81. Deenergisation of relay 81 cause its contacts 811 to revert to the position illustrated, restoring control of the front wheels to the steering wheel.

Thus when the switch 80 is closed an attempt to brake results in loss of braking and of steering and marginal control of both can be retained only by 'pumping' the brake pedal to open and close the switch 84 and thus energise and deenergise the relay 81 and the solenoid 82.

An associated circuit consists of a switch 92 in series with a relay 94 and a resistor 96, the relay contact 941 connecting to the supply the resistor network associated with the switch 54. It can be seen from this that closure of switch 92 energises the relay 94 to open the contacts 941 to give a zero signal through the switch 52 to the level selector 56. This disables the motor 22 so that the front wheels remain fixed in the position that they were in when the contacts 941 opened.

The relay 94 is short circuited by a circuit through the brake switch 84, an impulse timer 98 and a clutch switch 100 so that depression of both the brake pedal and the clutch pedal causes deenergisation of the relay 94 to restore normal steering control. However the impulse time only conducts for a brief interval (0.3 sec) after which the short circuit is broken and steering control is again lost until the brake pedal is released and depressed.

Control of the rear wheel steering is similar. The rear steering motor 22A is energised by the amplifier 58 in accordance with a signal received by the amplifier 60A through the level selector 56A which in turn is controlled by the switch 54A and an associated resistor chain. The inputs to the amplifier 60A are a demand signal from a level selector 64A and a feedback signal from the potentiometer 28A indicative of the position of the rear wheels.

The signal limiter is controlled by a potentiometer 68 so that there is no mechanical interference with the rear wheels at maximum lock. The input to the signal limiter 68 is connected to a line 110 and also to a three position switch 72, the three positions being a negative input, a positive input and a connection to a three position switch 62A corresponding to the three position switch 62 previously described.

The line 110 connects through relay contacts 991 to an amplifier network which will now be described. A resistor chain 112 extends between positive and negativesupply terminals and has its mid point connected back to the output of the potentiometer 28. The four amplifiers 114, 116, 118 and 120 each have one input connected to a respective point on the resistor chain the other inputs being connected in common to the output of the feedback potentiometer 28A on the rear axle pinion shaft. The output of amplifier 114 is connected through a reverse diode to the relay contacts 991 which the output of amplifier 120 is connected through a forward diode to the contacts 991. The outputs of amplifiers 116 and 118 are connected through forward diodes to the base of a transistor 122.

A second resistor chain 123 is connected between the positive and negative supplies while its mid point is connected to the zero voltage point. An amplifier 124 has its negative input connected to one point in the chain 123 and a second amplifier 126 has its positive input connected to a second point in the chain 123 while their other inputs are connected through a resistor 127 to the output of the potentiometer 28A. The outputs of the amplifiers 124 and 126 are connected through reverse diodes to a point connected to the positive supply through a resistor 131 and through a forward diode to the base of a transistor 128. A relay 99 connects the collector of the transistor 128 to the positive supply through a switch 134, while the collector of transistor 128 is connected to the collector of transistor 122 by a second set of contacts 992 of the relay 99. The emitters of the transistors 122 and 128 are connected to the zero voltage supply and a capacitor 129 connects the zero voltage supply to the positive inputs of the amplifiers 124 and 126.

To understand the operation of the amplifier network it is initially assumed that there is a zero signal from switch 62A through switch 72 to the input of the signal limiter 64A and that all the wheels are in their central positions. In this situation closure of the switch 134 energises the relay 99 through the transistor 128, the relay contacts 991 and 992 closing, though none of the amplifiers is yet providing an output.

If now the steering wheel is turned the signal from the master potentiometer 24 changes from zero in say a positive direction (e.g. to the right) thus driving the center point of the resistor chain 112 positive. Above a given threshold the amplifier 118 begins to conduct which in turn switches on the transistor 122 to provide a second energisation circuit for the relay 99. If the signal from the master potentiometer 24 increases further the amplifier 120 conducts to apply a positive signal through the closed contacts 991 to the input of 64A thus causing the rear wheels to move in the direction to reinforce the movement of the front wheels i.e. to the left. This causes the output of the potentiometer 28A to go negative and this signal applied to the negative input of the amplifier 120 and correspondingly increases its output. The result is that the rear wheels very quickly move to their limit and the vehicle has developed violent oversteer corresponding to a rear wheel skid. This condition can be corrected by the driver applying reverse lock i.e. turning the steering wheel to the left until all four wheels are parallel and the outputs of the potentiometers 28 and 28A are equal and the amplifiers 118 and 120 have zero outputs. In this condition the zero signal now present at the input of 64A causes the rear wheels to return to their central position. The relay 99 is also deenergised when the transistor 122 ceases to conduct as the transistor 128 has already been switched off when the negative output of the potentiometer 28A passing through the amplifier 124 was applied to the base of the transistor 128.

As the rear wheels return to their central position the negative output from the potentiometer 28A reduces below the level to keep the amplifier 124 conducting to maintain the transistor 128 switched off. The negative voltage is however maintained for a brief interval, by the timing circuit comprising the combination of resistor 127 and capacitor 129. After this brief interval, the initial conditions are restored and if by then the front wheels are not in their central position a more violent oversteer or skid in the opposite direction is initiated and amplifiers 114, 116 and 126 are involved.

Figure 2:
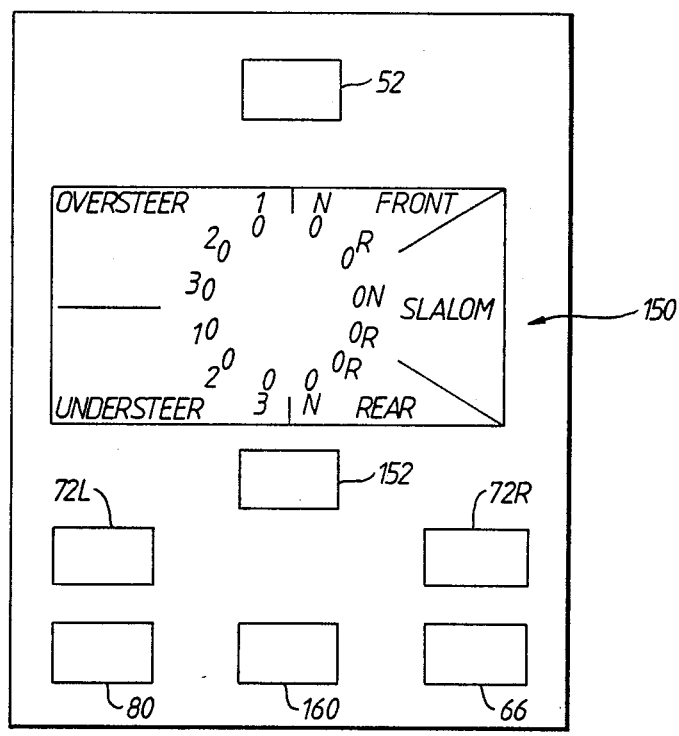
FIG. 2 shows a control panel used with the system shown in FIG. 1.

In FIG. 2 is shown the front panel of a hand held control unit. At the center top of the unit is the ON/-OFF switch 52 and in the center is a twelve position rotary switch 150 which will be discussed in more detail below. Beneath the rotary switch 150 is a single cut out switch 152 which is not otherwise described herein but which operates to disable the vehicle's ignition system. Further down there are two swivel switches 72L and 72R which while pressed cause the rear wheels to swivel to the left or right respectively and correspond to the negative and positive inputs respectively of the switch 72 of FIG. 1.

The bottom row of switches comprises the brake override switch 80, an action switch 160 and the limit switch 66.

Before discussing further the operation of the rotary switch 150, it should be understood that many of the switches referred to in FIG. 1 are for simplicity shown as mechanical switches though in reality they are electronic switches known as analogue switches or multiplexers.

Considering the positions of the rotary switch 150 in clockwise order from the top the first two positions relate simply to the front wheels and provide normal and reverse steering respectively by causing switch 62 to connect normal or reverse polarity through to the signal limiter 64. The other switch positions in the front wheel control channel to the amplifier 50 are as shown and in the rear wheel control channel the switch 62A connects to the zero signal i.e. the central position as shown in FIG. 1. It should be explained here that these and all other positions of the rotor switch 150 are selected but remain inoperative until the action button 160 is depressed. Normal front wheel steering feels exactly the same as steering a normal vehicle but reversed front wheel steering causes the vehicle to turn in the opposite direction from that in which the wheel is turned.

The next two positions of the rotary switch are normal and reverse slalom positions. In the normal slalom position both the switches 62 and 62A connect to the normal polarity signal from the potentiometer 24 i.e. the upper position as seen in FIG. 1. This means that movement of the wheel turns all wheels in the same direction so that the vehicle does not turn but rather moves crabwise.

In the reserve slalom position both switches 62 and 62A connect to the inverted signal from the potentiometer 24. The effect is again that the vehicle does not turn but moves crabwise in the direction opposite to that in which the steering wheel is turned.

The next two positions of the rotary switch are normal and reverse rear wheel steering. With normal rear wheel steering the switch 62 connects to the zero signal on the central position shown in FIG. 1 while 62A connects to the normal signal from the potentiometer 24 in the up position. This combination locks the front wheels in the central position and gives simple rear wheel steering of the vehicle. With reverse rear wheel steering the switch 62A is connected to the inverted potentiometer signal in the bottom switch position to give rear wheel steering but in the direction opposite to the steering wheel movement.

The next three positions of the rotary switch 150 are understeer 3, 2 and 1. In the understeer mode switch 62 is in the normal signal position i.e. up in FIG. 1, and switch 62A is in the zero position. The top position of the switch corresponds to normal steering while the middle and lower positions of the switch 54 correspond to understeer 1 and 2 respectively. In understeer 3 the switch 92 is also closed. The understeer modes essentially correspond to a front wheel skid in which the vehicle responds more slowly to movement of the steering wheel in the understeer 1 and 2 and the precise response in understeer 3 has been discussed previously when discussing the circuits of the switch 92.

The last three positions of the rotary switch 150 are the three oversteer modes which have been discussed previously when considering the amplifier circuits. The difference between the three modes is the position of the switch 54A, the top position giving the fastest response being the most difficult mode, oversteer 3.

The vehicle as described enables an instructor using the hand held control unit to simulate for a driver under tuition driving hazards such as front and rear wheel skids at low speeds and on a perfectly dry road surface while also requiring the driver to react correctly if control of the vehicle is to be maintained. Moreover the vehicle can be used in other modes of less practical application, e.g. reverse slalom, but which are of considerable interest as novelty or fun modes.

It is also pointed out that while the vehicle described is intended for use off public roads, it can be rendered fit for use on public roads by disengaging the clutch 20, engaging the clutch 18 and applying the brake 31 when the rear wheels are central.

Various indicating devices may be provided to supplement the system as described. A meter 74 may be connected to indicate the voltage difference between the outputs of the front motor potentiometer 28 and the rear motor potentiometer 28A, indicative of the vehicle's current radius of turning. A voltage sensing device 76 may be connected between the output of front motor potentiometer 28 and the output of master potentiometer 24, and used to actuate an audible alarm in the event of a predetermined voltage level being exceeded as indicative that the front wheels have lost adhesion, and/or that the driver has not responded correctly to an imposed loss of control.

In a modified embodiment of the invention a throttle linked potentiometer such as the potentiometer 71 is used to modify the oversteer condition by limiting the movement of the rear wheels as oversteer commences and by making it an additional condition of regaining vehicle control that the accelerator be released. The modification corresponds to a skid induced by excessive use of the accelerator in a rear wheel drive vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A vehicle with a steering arrangement comprising: a front axle with road wheels, a steering wheel, a steering mechanism responsive to rotation of the steering wheel for adjusting the steering angle of the road wheels; a rear axle having road wheels, a rear wheel steering mechanism having a rear input shaft for adjusting the steering angle of the rear axle road wheels, a rear axle motor connected with the rear input shaft, means responsive to rotation of the steering wheel for selectively generating one of a plurality of rear axle demand signals for said rear axle motor, means for generating a rear axle feedback signal indicative of the position of the rear input shaft, and means for comparing the demand signal and the feedback signal and generating a rear axle difference signal, the rear axle motor responding to the difference signal to rotate said rear input shaft and thereby reduce said rear axle difference signal, at least one of said plurality of demand signals causing the rear wheels to steer in the opposite direction from that being steered by the front wheels; and wherein the front wheel steering mechanism has a front input shaft, a front axle motor connected with the front input shaft, means responsive to rotation of the steering wheel for generating a front axle demand signal for the front axle motor, means for generating a front axle feedback signal indicative of the position of the front wheel steering mechanism front input shaft and means for comparing the front axle demand and feedback signals and generating a front axle difference signal, the front axle motor responding to the front axle difference signal to rotate said front input shaft and thereby reduce said front axle difference signal.

2. A vehicle as claimed in claim 1, in which the road wheels are provided with brakes and a brake pedal and means are provided for rendering said brakes inoperative except for a brief interval after each depression of the brake pedal.

3. A vehicle as claimed in claim 2, in which the means for rendering the brakes inoperative has means which adjusts the front axle wheels to a central position irrespective of the position of the steering wheel.

4. A vehicle as claimed in claim 1, including means comparing the front axle feedback signal with a predetermined threshold value and turning the rear wheels in the opposite direction to the front wheels when the feedback signal exceeds said predetermined threshold value.

5. A vehicle as claimed in claim 4, including further means for restoring the rear wheels to their central position when the feedback signals from the two axles are the same.

6. A vehicle with a steering arrangement comprising: a front axle with road wheels, a steering wheel, a steering mechanism responsive to rotation of the steering wheel for adjusting the steering angle of the road wheels; a rear axle having road wheels, a rear wheel steering mechanism having a rear input shaft for adjusting the steering angle of the rear axle road wheels, a rear axle motor connected with the rear input shaft, means responsive to rotation of the steering wheel for selectively generating one of a plurality of rear axle demand signals for said rear axle motor, means for generating a rear axle feedback signal indicative of the position of the rear input shaft, and means for comparing the demand signal and the feedback signal and generating a rear axle difference signal, the rear axle motor responding to the difference signal to rotate said rear input shaft and thereby reduce said rear axle difference signal, at least one of said plurality of demand signals causing the rear wheels to steer in the opposite direction from that being steered by the front wheels; and wherein the rear axle demand signal has a direct relationship to the amount of rotation of the steering wheel, the vehicle being provided with means for varying that relationship, and further including means for adjusting the power supply to the rear axle motor and thereby the speed of response of the rear axle motor to a change in the rear axle demand signal.

* * * * *